US012753116B2

(12) United States Patent
Kim

(10) Patent No.: US 12,753,116 B2

(45) Date of Patent: Oct. 6, 2026

(54) METHOD FOR MANUFACTURING FIBER COMPOSITE FOR REINFORCING CONCRETE, AND CONCRETE COMPRISING FIBER COMPOSITE MANUFACTURED THEREBY

(71) Applicant: Ik Kim, Busan (KR)

(72) Inventor: Ik Kim, Busan (KR)

(*) Notice: Subject to any disclaimer, the term of this patent is extended or adjusted under 35 U.S.C. 154(b) by 823 days.

(21) Appl. No.: 17/610,880

(22) PCT Filed: May 13, 2019

(86) PCT No.: PCT/KR2019/005709

§ 371 (c)(1),
(2) Date: Nov. 12, 2021

(87) PCT Pub. No.: WO2020/230914

PCT Pub. Date: Nov. 19, 2020

(65) Prior Publication Data

US 2022/0212990 A1 Jul. 7, 2022

(51) Int. Cl.

| | |
|---|---|
| ***C04B 16/06*** | (2006.01) |
| ***C04B 20/00*** | (2006.01) |
| ***C04B 20/10*** | (2006.01) |
| ***C04B 103/00*** | (2006.01) |
| ***D02G 3/28*** | (2006.01) |
| ***D02G 3/40*** | (2006.01) |
| ***D02G 3/44*** | (2006.01) |

(52) U.S. Cl.

CPC ...... *C04B 16/0683* (2013.01); *C04B 20/0068* (2013.01); *C04B 20/1014* (2013.01); *D02G 3/28* (2013.01); *D02G 3/404* (2013.01); *D02G 3/447* (2013.01); *C04B 2103/0045* (2013.01); *C04B 2201/50* (2013.01); *D10B 2331/042* (2013.01); *D10B 2401/063* (2013.01); *D10B 2505/02* (2013.01)

(58) Field of Classification Search

CPC ............ C04B 16/0625; C04B 16/0683; C04B 16/0691; C04B 20/0068; C04B 20/1014; C04B 20/1033; C04B 20/1037; C04B 2103/0045; C04B 2111/00155; C04B 2201/50; C04B 28/02; D02G 3/28; D02G 3/404; D02G 3/447

See application file for complete search history.

(56) References Cited

FOREIGN PATENT DOCUMENTS

| | | |
|---|---|---|
| JP | 2007-070204 A | 3/2007 |
| JP | 2009-046327 A | 3/2009 |

(Continued)

OTHER PUBLICATIONS

English Machine Translation: Jung et al. (KR 101958356).*
English Machine Translation: Ikehata et al. (JP 2018-002535).*

*Primary Examiner* — Holly Rickman
*Assistant Examiner* — Linda N Chau

(57) ABSTRACT

The purpose of the present application is to provide a fiber composite for reinforcing concrete, the fiber composite providing a specific number of twists so as to have pull-out resistance in concrete, being capable of serving as a concrete reinforcement since hydrophilic compound, which can bind to concrete by hydrogen bonding, is coated on concrete and the fiber composite, maintaining the shape of fibers when mixed into concrete, reducing a rebound rate during shotcrete placing, and maintaining linearity within concrete.

5 Claims, 1 Drawing Sheet

(56) References Cited

FOREIGN PATENT DOCUMENTS

| | | | |
|---|---|---|---|
| JP | 2018-002535 | A | 1/2018 |
| KR | 10-0971114 | B1 | 7/2010 |
| KR | 10-2016-0137898 | A | 12/2016 |
| KR | 10-2017-0140848 | A | 12/2017 |
| KR | 10-1958356 | B1 | 3/2019 |
| KR | 10-1950849 | B1 | 5/2019 |

* cited by examiner

[FIG. 1]
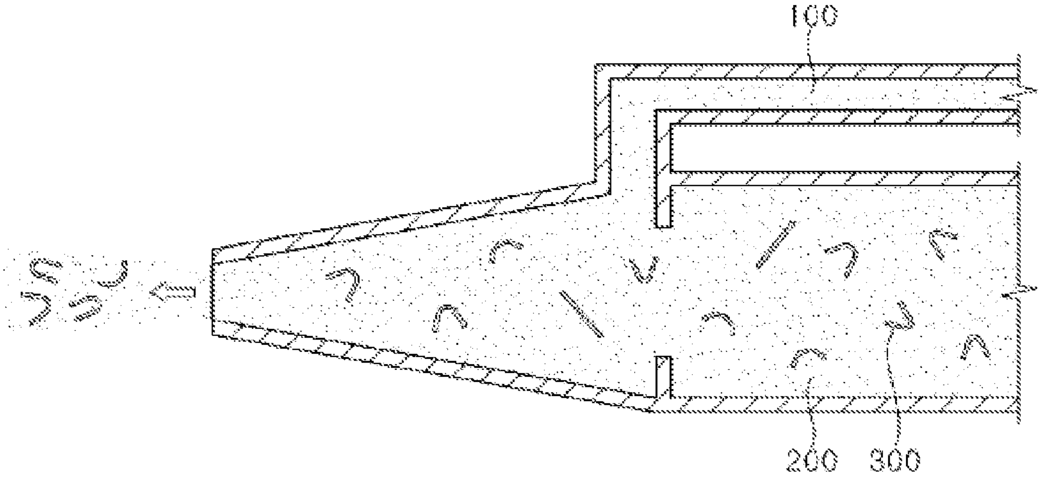
[FIG. 2]
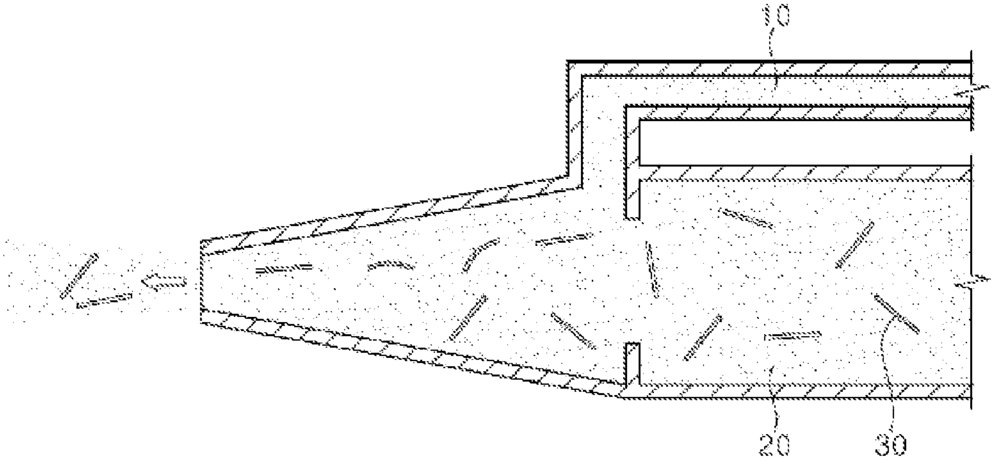

METHOD FOR MANUFACTURING FIBER COMPOSITE FOR REINFORCING CONCRETE, AND CONCRETE COMPRISING FIBER COMPOSITE MANUFACTURED THEREBY

FIELD OF INVENTION

The present disclosure relates to a method of manufacturing a fiber composite for reinforcing concrete and concrete including the fiber composite for reinforcing concrete.

BACKGROUND OF INVENTION

Cement materials such as mortar, concrete, and shotcrete (hereinafter refer to as "concrete") are generally used for a building structure or a tunnel, but microcracks easily occur in concrete at an early stage.

In order to prevent cracks from occurring in concrete, concrete with steel fibers such as rebar pieces has been developed. However, the steel fibers easily corrode when used in a construction site such as a tunnel in which there is a large amount of moisture, and dispersibility in concrete is degraded due to a high specific gravity of the steel fibers. In particular, there has been a problem in that the amount of steel fibers bounced out (a rebound amount) increases while shotcrete is poured and the load of concrete increases.

In order to overcome the conventional problem, recently, research has been conducted into a method using synthetic fibers instead of steel reinforcement materials such as steel fibers. However, synthetic fiber does not does not improve basic structural performance such as flexural strength or flexural performance of concrete, but is known to achieve only an effect of preventing cracks in concrete.

In the case of polypropylene fiber currently used as a reinforcement material for concrete, tensile strength of fiber itself is good, but adhesion performance with concrete is degraded due to hydrophobicity of fiber itself, and thus the tensile strength of the fiber itself is not sufficiently achieved. Thus, in order to improve adherence and dispersibility with concrete of concrete reinforcement fiber, there have been proposed methods such as a method of forming a curve on a fiber side, a method using different types of fibers with different lengths and diameters, or a method using reinforcing fibers with different cross sections.

However, even if the reinforcing fiber is used, dispersibility with concrete is improved to some extent, but there is a problem that adherence with concrete is not sufficiently improved.

Cited Reference (Patent Document 1) Korean Patent Publication No. 10-0971114

SUMMARY OF INVENTION

Technical Problem to be Solved

It is one object of the present disclosure to provide a method of manufacturing a fiber composite for reinforcing concrete having spinning resistance performance in concrete by increasing friction between the concrete and the fiber composite using a specific number of turns per meter of a fiber filament yarn.

It is another object of the present disclosure to provide fiber composite for reinforcing concrete manufactured using the manufacturing method. In addition, is another object of the present closure to provide concrete reinforced with a fiber composite, including the fiber composite for reinforcing concrete in a specific range.

It is another object of the present disclosure to provide a fiber composite for reinforcing concrete for maintaining initial modulus of the fiber composite reinforcing concrete to achieve at least partial hydrogen bond between the fiber composite and the concrete as concrete reinforcement and to maintain linearity in the concrete.

It is another object of the present disclosure to provide a fiber composite for reinforcing concrete including a filament yarn for a fiber composite and a hydrophilic coating solution for coating the filament, wherein the hydrophilic coating solution penetrates a microstructure in a fiber to function as chemical bond (e.g., covalent or ionic bond between an epoxy group of a coating solution having a hydrophilic group and an end group of polyethylene terephthalate, etc. used as a filament yarn) with the fiber and/or an anchor (e.g., some elements (polyhydric alcohol, benzene, phenol, etc.) of the coating solution penetrate an amorphous region of the fiber during heat setting and then are fixed upon cooling) to ensure cohesion with the fiber and to achieve hydrogen bond between the hydrophilic group of the hydrophilic coating solution and the concrete, thereby increasing cohesion with the concrete and improving reinforcement performance.

Technical Solution

Hereinafter, the present disclosure will be described in more detail. Content that is not described in the specification will be omitted since those skilled in the art can sufficiently recognize and infer the content.

Each description and embodiment described in the present disclosure may be applied to other descriptions and embodiments, and the scope of the present disclosure is not interpreted as being limited by a specific description described below.

To achieve the above objectives, an aspect of the present disclosure provides a method of manufacturing a fiber composite for reinforcing concrete, the method including forming a helix structure by twisting two or three strands of filament yarns for fiber composite to have turns per meter (TPM) of 200 to 500, and drying and heat-treating the twisted fiber composite after coating the twisted fiber composite in a coating solution.

According to the present disclosure, the filament yarn for the fiber composite may use one or more filaments selected from the group consisting polyethylene terephthalate, polyethylene naphthalate, and polyamide (which has a hydrophilic group), and in particular, may be polyethylene terephthalate.

The total fineness of the filament yarn for the fiber composite may be in the range of 1000 to 6000 denier, in particular, in the range of 2000 to 4000 denier.

As a first operation of the method of manufacturing the fiber composite, two or three strands of fiber composite yarns may be twisted by a direct twisting machine that simultaneously performs false twist and ply twist to manufacturer a raw cord, and then a helix structured may be formed on a surface of the twisted fiber composite through turns per meter (TPM) in the range of 200 to 500. The twisting may be performed through ply twist by applying primary twist (ply twist) to the fiber composite yarn and then performing secondary twist (cable twist), and in general, the secondary twist (cable twist) and the primary twist (ply twist) may apply the same TPM or different TPMs as necessary.

A reinforcement of the fiber composite manufactured according to the present disclosure may be manufactured to simultaneously have 200/200 TPM to 500/500 TPM for secondary twist (cable twist)/primary twist (ply twist). In the state in which a cord is manufactured using the secondary twist (cable twist) and the primary twist (ply twist) to have the same TPM in order to easily maintain mono filaments on a straight line to maximize physical properties. In the case of a value less than 200/200 TPM, a rotation angle of a raw cord may be reduced to easily degrade spinning resistance performance. In particular, an angle of a helix structure formed on a surface of the fiber composite according to the present disclosure is not particularly limited, but an angle of yarns in an axial direction of the fiber composite may be 50 to 100°.

In a manufacturing method according to the present disclosure, the physical properties such as strength, mid-strength, and fatigue resistance of the fiber reinforcement may be changed depending on turns per meter (TPM) applied to the fiber composite fiber during primary twist (ply twist) or secondary twist (cable twist). In general, when the TPM is high, strength tends to be reduced, and the mid-strength and weak-strength tend to be increased.

Then, in second operation of the method of manufacturing the fiber composite, the twisted fiber composite may be immersed in a coating solution and may then be dried and heat-treated.

According to the present disclosure, the fiber composite is immersed in the coating solution for coating or adhesion with a resin that has cohesion with PET and includes a hydrophilic group because polyethylene terephthalate (PET) used in the fiber composite includes very few hydrophilic groups and has no adhesion with concrete.

The coating solution (or an adhesive solution) may be one or more selected from the group consisting or an epoxy compound, polyhydric alcohol, polyhydric phenol, resorcinol-formalin-latex (RFL), and polyvinyl chloride (PVC). Here, the epoxy compound may have at least two epoxy groups in one molecule and may include a have halogenated compound such as epichlorohydrin, and the polyhydric alcohol may include a compound such as glycerol, ethylene glycerol, diethylene glycol, sorbitol, propylene glycol, polyethylene glycol, and denacol.

The coating solution may have a hydrophilic group, may be a solution of a material with high adhesion with the fiber composite, and may penetrate a microstructure in the fiber composite to function as an anchor or to partially function as chemical bond. In particular, a short fiber may entirely function as an anchor to increase a contact area with concrete while loops formed on a surface of the fiber composite have a form in which a yarn is released on a cutting surface. Thus, friction characteristics between concrete and the fiber reinforcement may be increased, thereby increasing concrete physical properties.

In addition, a polypropylene fiber, etc. as a hydrophobic polymer used as a conventional reinforcing fiber may have high tensile strength of the fiber itself, but adherence performance with concrete may be degraded due to hydrophobic properties itself, and thus the tensile strength or the fiber itself does not tend to sufficiently achieve the tensile strength itself. In addition, an emulsion for coating a polypropylene fiber, etc as a hydrophobic polymer is also hydrophobic, and thus the coated fiber reinforcement may also be hydrophobic thereby degrading adherence performance with concrete.

However, polyethylene terephthalate, polyethylene naphthalate, and polyamide used in the present disclosure may be coated with a hydrophilic coating solution (an epoxy compound, resorcinol-formalin-latex (RFL), polyhydric alcohol, polyhydric phenol compound, or the like) to have hydrophilic properties. Thus, according to the present disclosure, the fiber composite may increase adherence performance with concrete through affinity with concrete and hydrogen bonding.

The immersing is performed with 0.1 to 10%, in detail, 0.2 to 5.0%, or 0.3 to 4.0% of solid content in the coating solution based on a weight of the twisted fiber composite. When content of the coating solution is excessively low, adhesion may be degraded, and when the content of the coating solution is excessively high, a heat-treatment process needs to excessively performed, and thus hydrolysis of PET used as the fiber composite may be caused to degrade physical properties.

According to an embodiment of the present disclosure, the method of manufacturing the fiber composite for reinforcing concrete may further include cutting the fiber composite in a length of 10 to 100 mm. In detail, the length may be 20 to 80, or 30 to 80 mm.

In order to complete the fiber composite according to the present disclosure, the fiber composite needs to be cut to the appropriate length in consideration of constructability and physical properties. The appropriate length may be changed depending on various conditions, but may be 30 to 70 mm. When the length is less than 30 mm, if external force is applied to break the concrete structure, reinforcement performance may be degraded, and when the length is equal to or greater than 70 mm, if the fiber composite is mixed with concrete, it is difficult to disperse the result, even during construction, the result may be folded or become tangled, resulting in poor constructability, and after construction, it is difficult to uniform distribute the result, and thus it may be difficult to achieve physical properties.

According to another embodiment of the present disclosure, the drying may be performed at 100 to 150° C., and the heat-treating may be performed at 220 to 250° C.

According to the present disclosure, the heat-treatment may also be referred to heat setting and may be performed to maintain a shape of a raw cord immersed in a coating solution resin in a concrete mixture and to have cohesion and may be performed at a temperature of 220 to 250° C. for 50 to 90 seconds. When heat setting is performed for 90 seconds or more, it may not be appropriate due to low strength of the twisted fiber composite when concrete is mixed and poured. When heat setting is performed at a time less than 50 seconds, delamination may occur between the twisted fiber composite and epoxy due to an insufficient reaction time with an epoxy compound used as a coating solution. Through the heat setting, the coating solution may penetrate a microstructure in the fiber to function as chemical bond with the fiber and an anchor to ensure cohesion with the fiber and to achieve hydrogen bond between a hydrophilic group of a hydrophilic coating solution and concrete, thereby increasing the cohesion with concrete and improving reinforcement performance.

In another aspect, the present disclosure provides a fiber composite for reinforcing concrete manufactured using the aforementioned method of manufacturing a fiber composite for reinforcing concrete. In another aspect, the present disclosure provides concrete (structure) reinforced with a fiber composite in the range of 5 to 20 kg per 1 cubic meter (1 $m^3$) of concrete. The concrete may be shotcrete. According to the present disclosure, an input amount of the fiber composite may be sufficient as long as the fiber composite functions as reinforcement in the concrete, but a large amount of the fiber composite, which is to be an impurity level, needs to be avoided.

The physical properties of concrete may be checked by performing a residual strength test of fiber reinforced concrete, and by measuring flexural strength, equivalent flexural strength, etc. of the fiber reinforced concrete. In an aspect, in the concrete structure including the fiber composite according to the present disclosure, when measurement is performed using a KSF 2566 method, flexural strength may be equal to or greater than 4.5 MPa, and equivalent flexural strength may be equal to or greater than 3.0 MPa.

According to the present disclosure, the flexural strength may refer to force when a concrete structure is destroyed at an early stage, the equivalent flexural strength may refer to force (or force required for secondary destroying) for maintaining a concrete structure after the concrete structure is destroyed, and a measurement method may comply with KSF 2566.

In the concrete structure according to the present disclosure, when measurement is performed using a KSF 2566 method, flexural strength needs to be equal to or greater than 4.5 MPa to achieve desired dispersibility and cohesion with concrete. In addition, when the equivalent flexural strength is equal to or greater than 3.0 MPa, friction between the fiber composite according to the present disclosure and concrete may also be increased to prevent spinning that is deformation of the concrete fiber composite. In addition, in the fiber composite according to the present disclosure, tensile strength measured based on ASTM D885 needs to be equal to or greater than 18 kgf, which satisfies industry standards for concrete structures. When tensile strength is equal to or less than 12 kgf, if concrete is destroyed, the fiber composite may also be cut, and it is impossible to ensure reinforcing performance. In another aspect, the present disclosure provides a method of constructing a structure or a tunnel, including mixing the fiber composite for reinforcing concrete manufactured using the aforementioned method of manufacturing the fiber composite for reinforcing concrete with shotcrete as well as a general concrete structure to construct a construction surface of the structure or a shotcrete layer on an excavation surface of the tunnel.

A detailed description of these aspects has been described with regard to the method of manufacturing the fiber composite for reinforcing concrete, and thus will be omitted here.

In another aspect, the present disclosure provides a fiber composite for reinforcing concrete including a filament yarn for a fiber composite, wherein, when measured based on ASTM 2256, initial modulus of the fiber composite may be 30 g/d to 110 g/d. According to the present disclosure, a helix structure may be formed on a surface of the fiber composite. The fiber composite according to the present disclosure may be maintained to have linearity in concrete through the range of the initial modulus while further including a hydrophilic coating solution for coating the filament.

The "modulus (modulus of elasticity)" used in the present disclosure may be resistance force against external force (or deformation), and when modulus (modulus of elasticity) is high, strain (degree of deformation) may be low, and deformation that occurs when concrete is poured and concrete is mixed may be in a low level, and thus the initial modulus may be an important factor. A material having very modulus like steel fiber may be easily mixed because there is no deformation when concrete is mixed, but modulus (modulus of elasticity) is high when shotcrete is poured, and thus the amount of bounce of the material may be increased. Thus, when the modulus (modulus of elasticity) is very low, the material may not be easily mixed, and when the modulus is very high, the amount of bounce of the material may be increased when shotcrete is poured, and thus, appropriate modulus may be needed. The modulus of a test piece of the fiber composite may be measured through a tensile tester using an ASTM 2256 method after a yarn is stored four 24 hours in a constant temperature and humidity room in a condition as a standard state, that is, a temperature of 25° C. and relative humidity of 65%, and here, the length of the test piece may be 5 mm.

When initial modulus of the fiber composite according to is higher than 110 g/d, resistance performance against external force applied to concrete may be increased, and may be related to pouring performance during an operation using shotcrete. In detail, the concrete mixture is poured using a shotcrete gun at a high pressure, and thus the amount of bounce of steel fiber reinforcement may be 10% or greater of the pouring amount. However, the fiber reinforcement has lower specific gravity than the steel fiber and has low modulus, and thus a rebound amount may be absolutely low to reduce an input amount, and processing cost may not be caused, which may be economically advantageous Accordingly, when modulus is equal to or less than 30 g/d, if external force is applied to concrete, resistance performance (reinforcement performance) may be lowered, and when the modulus is equal to or greater than 110 g/d, resistance performance (reinforcement performance) against external force may be excellent, but a rebound ratio may be disadvantageously high. The modulus is closely related to the physical properties of the filament yarn used in the present disclosure, turns per meter, and a heat treatment process, and thus the range of the modulus needs to be limited to 30 to 110 g/d.

The modulus as the physical properties or the yarn may be 50 to 110 g/d, in detail, 60 to 110 g/d. The modulus may be a dominant factor that prevents the concrete structure from being destroyed while ensuring initial force, but whether the structure not deployed after being destroyed may be determined depending on the distribution, length, and content or the fiber reinforcement according to the present disclosure, mutual cohesion between the coating solution and concrete, etc.

According to another embodiment of the present disclosure, the hydrophilic fiber composite may be concrete reinforcement and may achieve at least partial hydrogen bond with concrete. According to another embodiment, the filament yarn for the fiber composite may be one or more filaments selected from the group consisting of polyethylene terephthalate, polyethylene naphthalate, and polyamide, and the coating solution may be one or more selected from the group consisting of an epoxy compound, polyhydric alcohol, polyhydric phenol, resorcinol-formalin-latex (RFL), and polyvinyl chloride (PVC). As described above, the fiber composite for reinforcing concrete including the filament yarn and the hydrophilic coating solution may have hydrophilic properties, and thus may achieve at least partial hydrogen bond concrete coupled with fiber reinforcement.

According to another embodiment of the present disclosure, the fiber composite may be maintained to have linearity in the concrete. Conventional fiber reinforcement may be injected to the outside by pressure of an injector of shotcrete, and simultaneously, the fiber may be partially bent due to the elasticity of the fiber or may be curved, thereby clogging a nozzle hole. However, the fiber composite for reinforcing concrete according to the present disclosure may be maintained in a specific range of modulus, and thus the injector may be maintained to have linearity without being bent or curved despite injection pressure, thereby preventing the nozzle hole from clogging.

FIG. 1 is a schematic diagram showing injection using an injector of shotcrete in which a conventional fiber composite is mixed. Pressure water may be injected into the injector of FIG. through a pressure water conduit 110, a conventional fiber composite 300 with mortar 200 including cement, sand, and the like may be injected into the injector, and then the result may be injected through a vent in a state of being mixed. The conventional fiber composite 300 may be largely deformed due to low modulus (modulus of elasticity) when concrete is mixed and poured, and the fiber composite may be bent or curved, thereby degrading the durability of a concrete structure or a tunnel.

In contrast, FIG. 2 is a schematic diagram showing injection using an injector of shotcrete in which a fiber composite according to the present disclosure is mixed. Like in FIG. 1, pressure water may be injected into the injector of FIG. 2 through a pressure water conduit a pressure water conduit 10, a fiber composite 30 according to the present disclosure may be with mortar 20 including cement, sand, and the like may be injected into the injector, and then the result may be injected through a vent in a state of being mixed. The fiber composite 30 according to the present disclosure has high flexural strength and thus most fiber composites may be present in a concrete structure or a tunnel while being maintained to have linearity without being bent or curved, thereby increasing the durability of the concrete structure or the tunnel.

In another aspect, the present disclosure provides a fiber composite for reinforcing concrete including a hydrophilic coating solution for coating a filament yarn for a fiber composite and the filament, wherein the hydrophilic coating solution penetrates a microstructure in the fiber to function as chemical bond with the fiber and an anchor to ensure cohesion with the fiber and to achieve hydrogen bond between a hydrophilic group of hydrophilic coating solution and concrete, thereby increasing the cohesion with concrete and improving reinforcement performance, and a fiber composite for reinforcing concrete having initial modulus of 30 g/d to 110 g/d may be maintained to have linearity in the concrete.

A detailed description of these aspects has been described with regard to the method of manufacturing the fiber composite for reinforcing concrete, and thus will be omitted here.

Effect of Invention

The present disclosure may provide a fiber composite for reinforcing concrete used as concrete reinforcement having sufficiently improved dispersibility and cohesion with concrete by deforming a shape of fiber reinforcement used as tire reinforcement.

The present disclosure may provide a fiber composite for reinforcing concrete for achieving at least partial hydrogen bond between the fiber composite and concrete as concrete reinforcement and reducing a rebound rate while being maintaining to have linearity in the concrete by maintaining modulus of the fiber composite for reinforcing concrete in a specific range.

In the fiber composite according to the present disclosure, a coasting solution of a fiber composite having a helix structure may penetrate a microstructure in the fiber to function as chemical bond with the fiber and an anchor to ensure cohesion with the fiber and to achieve hydrogen bond between a hydrophilic group a hydrophilic coating solution and concrete, thereby increasing the cohesion with concrete and improving reinforcement performance. The hydrophilic group of the hydrophilic coating solution may penetrate the microstructure to achieve a hydrogen bond, thereby improving the cohesion with concrete.

BRIEF DESCRIPTION OF DRAWINGS

FIG. 1 is a schematic diagram showing injection using an injector of shotcrete in which a conventional fiber composite is mixed.

FIG. 2 is a schematic diagram showing injection using an injector of shotcrete in which a fiber composite according to the present disclosure is mixed.

BEST MODE

Hereinafter, exemplary embodiments are presented to help understanding of the present disclosure. However, the following examples are provided for those skilled in the art to more easily understand the present disclosure, and content of the present disclosure is not limited by the examples.

EXAMPLE 1

Two strands of 1500 denier polyethylene terephthalate (PET) yarns were used to manufacture raw cord through secondary twist (cable twist)/primary twist (ply twist) with 390/390 TPM, and the raw cord was woven using a weaving machine. Then, a fiber composite was manufactured by immersing the result in an epoxy compound, primarily drying the result at 150° C. for 60 seconds, and then secondarily heat-setting the result at 230° C. for 60 seconds. A concrete structure test piece was manufactured by removing weft after cutting the manufactured fiber composite to a length of 50 mm and putting 11 kg of the fiber composite into 1 cubic meter ($m^3$) of concrete having a water content of 43%.

EXAMPLE 2

Example 2 was the same as Example 1 above except that 9 kg of the fiber composite was put into 1 $m^3$ of concrete.

EXAMPLE 3

Example 3 is the same as Example 1 above except that the fiber composite was cut to a length of 40 mm.

EXAMPLE 4

Example 4 was the same as Example 1 above except that the raw cord was immersed in a resorcinol-formalin-latex (RFL) compound.

Comparative Example 1

Comparative Example 1 was the same as Example 1 above except that 3 kg of the fiber composite was put into 1 cubic meter ($m^3$) of concrete.

Comparative Example 2

Comparative Example 2 was the same as Example 1 above except that the fiber composite was cut to a length of 20 mm.

Comparative Example 3

Comparative Example 3 was the same as Example 1 above except that secondary twist (cable twist)/primary twist (ply twist) had 100/100 TPM when manufacturing the raw cord.

Comparative Example 4

Comparative Example 4 was the same as Example 1 above except that the fiber composite was coated with an olefin-based resin as a hydrophobic resin when manufacturing the fiber composite.

Comparative Example 5

Comparative Example 5 was the same as Example 1 above except that a fiber composite with modulus of 280 g/d was manufactured using polyethylene naphthalate (PEN) yarns and used.

Table 1 (shows the physical properties of the fiber composites for reinforcing concrete and the physical properties of the concrete structures, the fiber composites and the concrete structures being manufactured in Examples 1 and 2, etc.)

inside the concrete during construction increases, and thus the rebound amount remarkably increases.

For reference, the flexural strength and the equivalent flexural strength are the same as described above, and a measurement method thereof is in accordance with KSF 2566.

The above description of the present disclosure is for illustration, and those of ordinary skill in the art to which the present disclosure pertains can easily change the present disclosure into other specific forms without changing the technical spirit or essential features of the present disclosure. Therefore, the embodiments described above are exemplary in all respects and should not be construed as limiting.

The invention claimed is:

1. A method of manufacturing a fiber-reinforced concrete, the method comprising:

twisting two strands of polyethylene terephthalate filament yarns for a fiber composite to have turns per meter (TPM) of 200 to 500 to form a helix structure in which 2 strands of yarns form an angle 50 to 100° in an axial direction of the fiber composite from a surface of the fiber composite to prevent reduction in spinning resistance performance; and forming a compound bond between the fiber composite and an epoxy compound coating solution by drying and heat-treating the fiber composite after immersing the fiber composite in the epoxy compound coating solution, wherein:

the immersing is performed with 0.3 to 4% of solid content in the epoxy compound coating solution based on a weight of the twisted fiber composite,

TABLE 1

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Fiber composite strength (kgf) | 22.5 | 22.5 | 22.5 | 22.5 | 22.5 | 22.5 | 23.2 | 22.7 | 22.9 |
| Modulus (g/d) | 80 | 80 | 80 | 80 | 80 | 80 | 117 | 80 | 280 |
| Flexural strength (MPA) | 4.7 | 4.5 | 4.61 | 4.53 | 3.98 | 3.99 | 4.6 | 4.51 | 4.72 |
| Equivalent flexural strength (MPA) | 3.53 | 3.12 | 3.24 | 3.15 | 1.8 | 2.0 | 2.1 | 2.4 | 3.32 |
| Rebound rate (%)* | 0.8 | 0.8 | 0.8 | 0.8 | 0.8 | 0.8 | 3.5 | 0.8 | 8.9 |

*Rebound rate refers to the amount of bounce compared to an input amount during shotcrete construction.

As seen from Table 1 above, in Comparative Example 1, a low amount of the fiber composite is put compared with the condition of Example 1, and thus concrete reinforcement performance is degraded to lower the flexural strength and the equivalent flexural strength of the concrete structure. It may be seen that, in Comparative Example 2, the length of the fiber composite is reduced compared with the condition of Example 1, and thus equivalent flexural strength is much degraded from the result of checking the reinforcement performance. It may be seen that, in Comparative Example 3, turns per meter (TPM) of the fiber composite is reduced to 100/100 TPM compared with the condition of Example 1, and thus friction (spinning resistance) of the concrete and the fiber composite is lowered to degrade the equivalent flexural strength of the concrete structure.

It may be seen that, in Comparative Example 4 in which the fiber composite was coated with an olefin-based resin as a hydrophobic resin that blocks hydrogen bonding between the fiber composite and the concrete, the equivalent flexural strength is also lowered. It may be seen that, in Comparative Example 5, when the fiber composite with high modulus is used, the amount of fiber composite bounced out rather than the drying is performed at 100 to 150° C., and the heat-treating is performed at 220 to 250° C. for 50 to 90 seconds such that the epoxy compound coating solution penetrates a microstructure in the fiber composite to function as chemical bond with the fiber composite and an anchor to ensure cohesion with the fiber composite and to achieve hydrogen bond between a hydrophilic group of the epoxy compound coating solution and concrete by mixing the fiber composite with the concrete, thereby increasing cohesion with the concrete and improving reinforcement performance, and wherein the fiber composite has an initial modulus of 80 g/d to 110 g/d, wherein the initial modulus is selected such that the fiber composite exhibits non-linear threshold rebound behavior during shotcrete application, with increased rebound rate occurring above 110 g/d, such that the fiber composite maintains linearity during concrete mixing and shotcrete injection and exhibits a reduced rebound rate compared with fibers having modulus greater than 110 g/d.

2. The method according to claim 1, further comprising: after the drying and heat-treating the fiber composite, cutting the fiber composite to a length of 10 to 100 mm.

3. The method according to claim 1, wherein the filament yarn for the fiber composite includes one or more filaments selected from the group consisting of polyethylene terephthalate, polyethylene naphthalate, and polyamide.

4. The method according to claim 1, wherein the twisting includes performing twisting to have total fineness of the fiber composite as 2000 to 4000 denier.

5. The method according to claim 1, wherein the coating solution includes one or more selected from the group consisting of an epoxy compound, polyhydric alcohol, polyhydric phenol, resorcinol-formalin-latex (RFL), and polyvinyl chloride (PVC).

* * * * *